United States Patent
Bhogal et al.

(10) Patent No.: US 7,454,744 B2
(45) Date of Patent: Nov. 18, 2008

(54) PRIVATE SOURCE CODE COMMENTING

(75) Inventors: Kulvir S. Bhogal, Fort Worth, TX (US); Hung T. Dinh, Austin, TX (US); Teng S. Hu, Austin, TX (US); Nizam Ishmael, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 914 days.

(21) Appl. No.: 10/614,548

(22) Filed: Jul. 3, 2003

(65) Prior Publication Data

US 2005/0005258 A1    Jan. 6, 2005

(51) Int. Cl.
G06F 9/44    (2006.01)
(52) U.S. Cl. ................... 717/122; 717/123; 717/140
(58) Field of Classification Search ............... None
See application file for complete search history.

(56) References Cited

U.S. PATENT DOCUMENTS

| | | | | |
|---|---|---|---|---|
| 5,247,661 | A | 9/1993 | Hager et al. | 395/600 |
| 5,428,729 | A | 6/1995 | Chang et al. | 395/153 |
| 5,579,520 | A * | 11/1996 | Bennett | 717/151 |
| 5,812,850 | A * | 9/1998 | Wimble | 717/131 |
| 5,907,705 | A | 5/1999 | Carter | 395/701 |
| 5,923,845 | A | 7/1999 | Kamiya et al. | 395/200.36 |
| 6,005,560 | A | 12/1999 | Gill et al. | 345/302 |
| 6,021,266 | A * | 2/2000 | Kay | 716/2 |
| 6,192,396 | B1 | 2/2001 | Kohler | 709/206 |
| 6,247,045 | B1 | 6/2001 | Shaw et al. | 709/207 |
| 6,263,362 | B1 | 7/2001 | Donoho et al. | 709/207 |
| 6,349,302 | B1 | 2/2002 | Aoyama et al. | 707/101 |
| 6,356,936 | B1 | 3/2002 | Donoho et al. | 709/206 |
| 6,529,942 | B1 | 3/2003 | Gilbert | 709/206 |
| 6,572,661 | B1 * | 6/2003 | Stern | 715/501.1 |
| 6,874,140 | B1 * | 3/2005 | Shupak | 717/131 |
| 6,983,446 | B2 * | 1/2006 | Charisius et al. | 717/113 |
| 2001/0032095 | A1 * | 10/2001 | Balbach | 705/1 |
| 2001/0042104 | A1 | 11/2001 | Donoho et al. | 709/207 |
| 2002/0059377 | A1 | 5/2002 | Bandhole et al. | 709/204 |
| 2002/0065884 | A1 | 5/2002 | Donoho et al. | 709/204 |
| 2002/0083142 | A1 | 6/2002 | Lagosanto et al. | 709/207 |

(Continued)

OTHER PUBLICATIONS

Simmons, "Communications: a software group productivity dominator", Software Engineering Journal, Nov. 1991, pp. 454-462.

*Primary Examiner*—Chuck Kendall
(74) *Attorney, Agent, or Firm*—Duke W. Yee; Marilyn Smith Dawkins; Theodore D. Fay, III

(57) ABSTRACT

A method, computer program product, and data processing system for exchanging information regarding software source code among a team of developers is disclosed. In a preferred embodiment of the present invention, a developer associates commentary with a particular code feature, such as a function or object class. A list of intended recipients or readers of the commentary is obtained from the developer. Additional settings regarding such things as an expiration date for the commentary are also obtained from the developer. The source code with associated commentary is then made available to the intended readers. If desired, the source code with associated commentary may be transmitted the intended recipients via e-mail or an "instant message" or other form of notification can be transmitted to the intended recipients to notify them of the commentary to be read.

12 Claims, 8 Drawing Sheets

U.S. PATENT DOCUMENTS

| | | | |
|---|---|---|---|
| 2002/0091779 A1 | 7/2002 | Donoho et al. | 709/206 |
| 2003/0025729 A1 | 2/2003 | Davis | 345/753 |
| 2004/0031015 A1* | 2/2004 | Ben-Romdhane et al. | 717/107 |

* cited by examiner

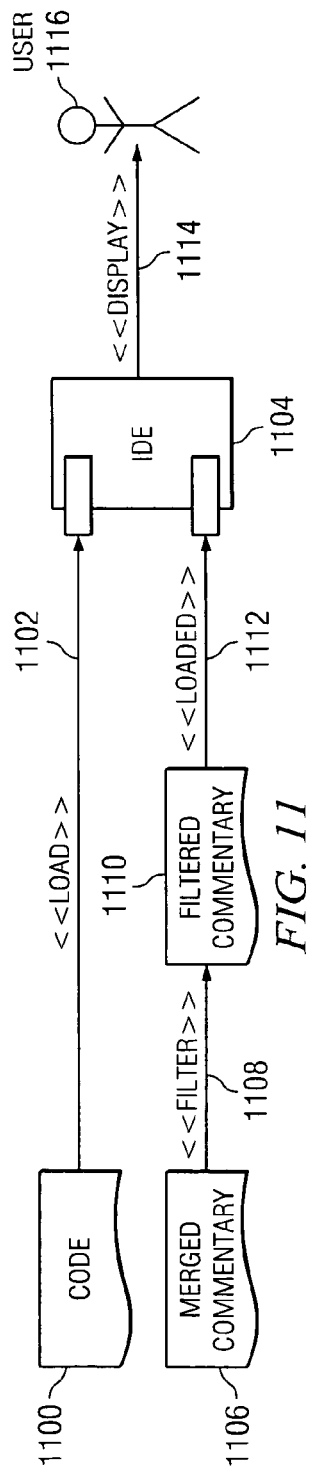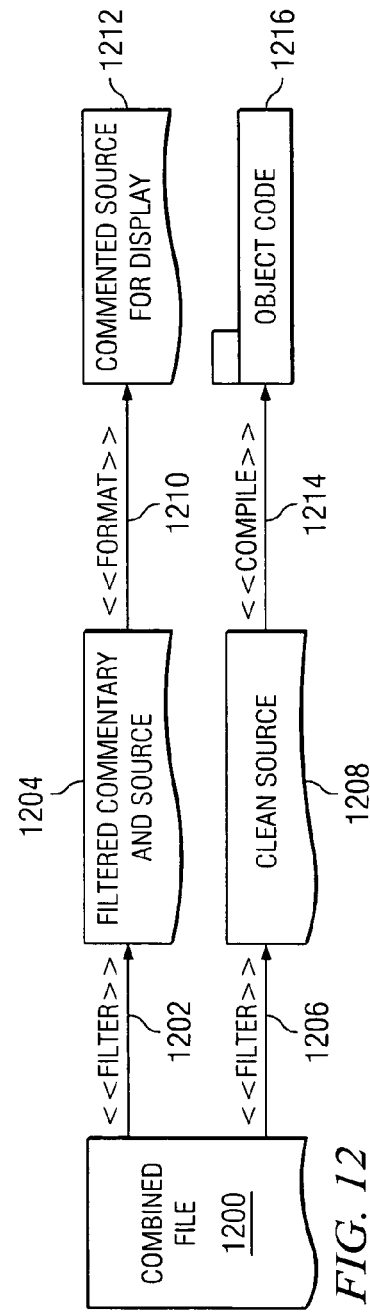

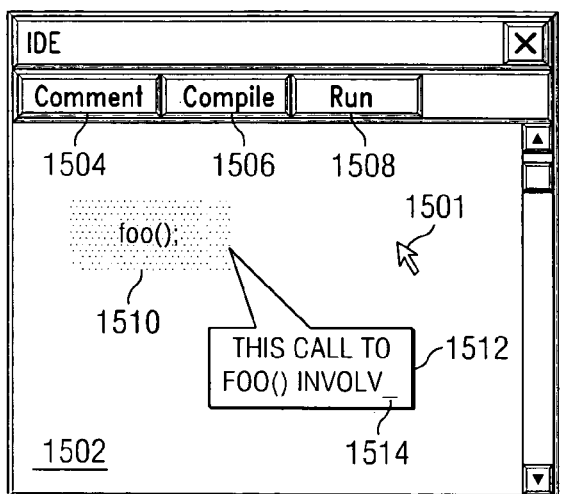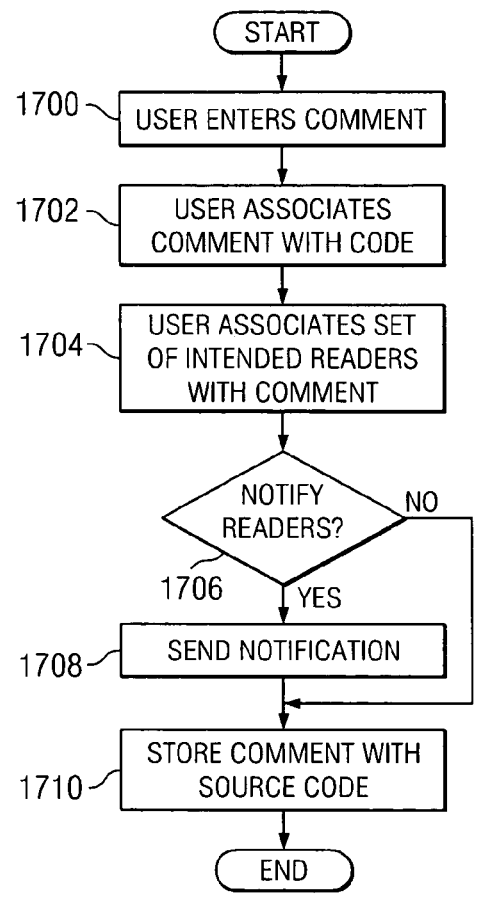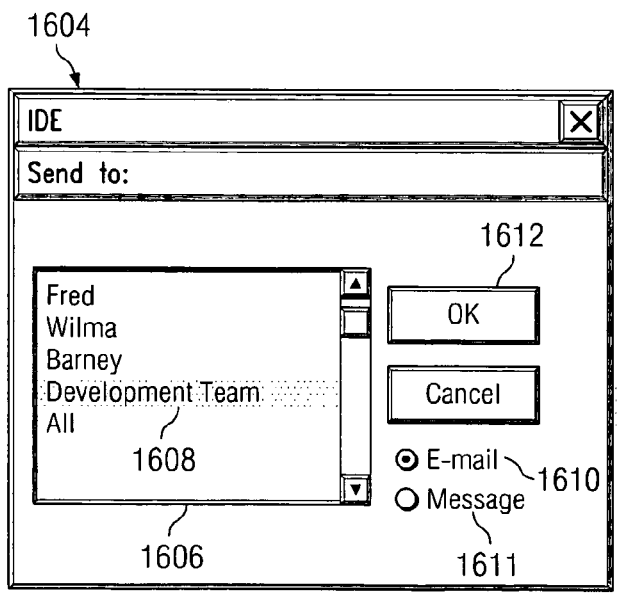

PRIVATE SOURCE CODE COMMENTING

BACKGROUND OF THE INVENTION

1. Technical Field

The present invention is related to computer-aided software engineering (CASE) tools for collaborative software development.

2. Description of Related Art

"Software engineering" is the practice of software development as an industrial discipline. The goal of Software Engineering is to produce high-quality, maintainable software through an efficient use of development resources.

Most commercially-developed-software is developed by teams of programmers. Very large software projects may require a large number of programmers or a large number of teams of programmers. One area of particular interest to Software Engineering is the interaction between members of a programming team and between programmers and management.

Conventional Software Engineering wisdom suggests that the task of producing a software product is best practiced by conceptualizing the product as a system of interrelated components, dividing the components among members of a programming team, having team members work in parallel to produce the components, and assembling the components into a working system. In other words, conventional wisdom suggests a "divide-and-conquer" approach to software development.

D. B. Simmons, "Communications: a software group productivity dominator," IEEE Software Engineering Journal, November 1991, pp. 454-462, for example, takes the position that a system design that is poorly partitioned will result in a large amount of inter-programmer communication to resolve dependency issues, which ultimately degrades productivity. In an ideal divide-and-conquer situation, inter-programmer communication should be unnecessary, so any time spent communicating, rather than on writing source lines of code (SLOC), degrades productivity. Simmons thus advocates employing careful system design and small team sizes to minimize communication between programmers, the ultimate goal being to approach an ideal "divide-and-conquer" scenario.

A dramatically different approach to inter-programmer communication can be found in the increasingly popular Software Engineering methodology known as "eXtreme Programming" (XP), which was founded by Ken Beck. XP is based on team collaboration on all phases of a software development project, rather than a pure divide-and-conquer approach. XP emphasizes continuous communication between members of a programming team, with the theory being that when all members of a team are familiar with the project as a whole, a project design can evolve as needed to resolve whatever issues may arise during the implementation phase of a project, such as dependency and integration issues. Thus, the XP methodology includes such concepts as common code ownership, in which all team members are allowed to work on any portion of the project.

Although divide-and-conquer and XP represent two very different approaches to software development, these two methodologies highlight the significant role that inter-programmer communication plays in a large software project. Two overarching principles come to mind: First, communication between team members is essential, because in a practical setting, dependency and integration issues between different programmers' work will invariably arise. Second, it is important to productivity that communication between team members is efficient. A design that is well-planned (as advocated in Simmons' article) or at least well-understood (as advocated in XP), can help in this respect.

Computer-Aided Software Engineering (CASE) is the subfield of Software Engineering that is concerned with developing software tools (called "CASE tools") for making software development more efficient and less error-prone. A number of existing CASE technologies are directed to problems relating to team software development, including communication between developers. Several of these are discussed below.

A number of configuration management tools exist in the art. Configuration management tools allow different versions (configurations) of a file to be maintained, so that a permanent copy of an earlier version of a file under modification can be maintained. These kinds of tools are very helpful in software development for maintaining different versions of source code files under development, because working or "stable" versions of source code files can be maintained while newer versions are being developed. Many configuration management tools also allow a "snapshot" of a group of source files to be made, so that a particular point in time of an entire software development project may be recorded.

Most modern configuration management tools also allow multiple users to "check out" files and "check in" modified versions of files, to ensure consistency of file versions for multiple users. Generally, a configuration management tool will keep a "log" so that comments regarding the changes made between versions can be recorded. Some configuration management tools, such as the open-source Concurrent Versioning System (CVS), allow for distributed access to a group of source files (i.e., they allow developers to access the files from remote computers on a network, such as the Internet). Revision Control System (RCS) is another popular open-source configuration management tool.

Some existing tools provide more extensive features for collaborative programming than do simple configuration management systems. Some of these tools are network- or World-Wide Web-based. For example, SOURCEFORGE™ is a trademark for a collaborative software development system produced by VA Software Corporation of Fremont, Calif. The SOURCEFORGE™ collaborative software development system is used by a number of organizations to support collaborative software development on organizational intranets using a web-based interface. The SOURCEFORGE™ collaborative software development system also forms the basis for "SOURCEFORGE™.net," which is reportedly the world's largest open-source development website.

Open-source software, particularly in recent times, is often a collaborative product of multiple developers working in remote locations over the Internet. The open-source Linux operating system, for example, was created by Linus Torvalds (for whom Linux is named) in Finland. Many enhancements to Linux, such as device drivers, have been contributed by programmers worldwide through the Internet.

SOURCEFORGE™.net supports a number of features that are conducive to collaborative programming over a wide-area network (WAN), such as the Internet. On SOURCEFORGE™.net, each open-source programming project is given a web page that includes a number of communication features for communicating with developers and users of open-source software products. "Trackers" are provided to allow users or developers to report bugs, request new features to be added to a program, or request technical support. Other, more general discussion forums, including a public message forum, mailing lists, and a news archive are also provided. A task manager application is provided for project planning and delegation of tasks among developers. Source code or binary releases of a software product may be downloaded from that product's SOURCEFORGE™.net page or from one of a number of mirror sites.

A developer (or user, for that matter) may also use the CVS configuration management system to "mount" to the project's code repository and download any version of the source code (including the latest "under development" sources). CVS may also be used by a developer having appropriate privileges to check out or check in source code files for inclusion in the project. SOURCEFORGE™.net also includes a "compile farm" for compiling and testing software on various platforms (e.g., that a particular developer might not have access to, otherwise).

Most computer languages have some facility for leaving (non-executable) comments in program code. For example, in the "C" programming language, comments are written between "slash-star" and "star-slash" delimiters (e.g., /* comment */). Some programming languages allow for more advanced commenting features. The JAVA™ programming language (a trademark of Sun Microsystems, Inc.) allows special "javadoc" comments that can be associated with particular classes, fields, or methods in a JAVA™ programming language source file. "javadoc" comments may include special tags to provide program documentation in a structured format. A tool, called "javadoc," is provided in Sun Microsystems' JAVA™ 2 Software Development Kit (J2SDK), which can compile the javadoc comments into specially-formatted Hypertext Markup Language (HTML) source for display in a web browser. The open-source Perl programming language version 5 (Perl 5), developed by Larry Wall, includes a similar feature to javadoc, called "POD," which stands for "plain old documentation."

The open-source Python programming language, developed by Guido van Rossum, includes a feature known as "doc strings." "Doc strings" are special strings, denoted by triple quotation marks, that are used to describe particular objects or functions in Python. Unlike ordinary comments, however, "doc strings" are available to a Python program at run-time. Because Python has an interactive mode to allow code to be entered and executed at an interpreter prompt, the ability to read program comments at run-time is particularly valuable in Python.

Literate programming is a programming methodology originated by Turing Award winner Prof. Donald Knuth of Stanford University. Literate programming is based on the idea that well-written program code should be written to be read by others. Knuth created the WEB programming system for literate programming in Pascal. WEB allows a programmer to write code in sections, in which each section contains a descriptive subsection for entering a natural language description of a portion of code, a macro section for defining macros, and a code section for entering Pascal code. The macro features of WEB allow a programmer to write code for presentation to a reader in any particular order.

WEB is made up of two programs, TANGLE and WEAVE, each of which processes a WEB source file. WEAVE formats the text documentation and pretty-prints the code in a format suitable for processing by Knuth's typesetting program TeX (which, incidentally, was written using WEB). TANGLE, on the other hand, removes the text documentation and performs macro substitutions to arrive at source code suitable for compilation by a Pascal compiler.

A number of literate programming tools have been developed for other languages. Some of these are patterned after Knuth's original WEB program, such as CWEB for literate programming in C, and FWEB for literate programming in Fortran. A number of language-independent literate programming tools are also available.

Thus, configuration management tools aid in the management of team programming projects by providing some degree of concurrency control and transaction management (in the database-management sense), and advanced documentation features, such as are provided in literate programming tools, make program code easier for others to understand. Both of these CASE technologies are a boon to software developers and software development teams, because they help developers collaborate effectively to manage complexity. In very large software projects, however, the process of collaborating itself may become quite complex.

Whether one views inter-developer communication as an unavoidable and necessary evil or as something to be encouraged the fact remains that communication needs to be efficient and effective. If too much information is exchanged, information overload can result and productivity and quality are compromised. On the other hand, when information is less freely exchanged, the process of acquiring, and disseminating necessary information may become inefficient.

There is a need, then, for an efficient form of information exchange between software developers working on a common project.

SUMMARY OF THE INVENTION

The present invention provides a method, computer program product, and data processing system for exchanging information regarding software source code among a team of developers. In a preferred embodiment of the present invention, a developer associates commentary with a particular code feature, such as a function or object class. A list of intended recipients or readers of the commentary is obtained from the developer. Additional settings regarding such things as an expiration date for the commentary are also obtained from the developer. The source code with associated commentary is then made available to the intended readers. If desired, the source code with associated commentary may be transmitted the intended recipients via e-mail or an "instant message" or other form of notification can be transmitted to the intended recipients to notify them of the commentary to be read.

The present invention may be embodied as part of an integrated development environment (IDE), in which an editor program and other programming tools (e.g., compilers, linkers, debuggers, etc.) are presented to the developer using a common interface (or in a common executable). Alternatively, the present invention may be embodied in a command-line style development tool, much like the "cc" and "make" command-line tools used in POSIX-based operating systems (POSIX stands for "Portable Operating System Interface, which is the name given to a family of operating system standards developed by IEEE, the Institute for Electrical and Electronics Engineers). The present invention may also be combined with configuration management software.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 11 is a flow diagram depicting a process of displaying commentary directed to a specific user in accordance with a preferred embodiment of the present invention;

FIG. 12 is a flow diagram depicting a process of generating commented source code and object code from a combined file in accordance with a preferred embodiment of the present invention;

FIG. 13 is a diagram depicting a portion of a source code document in which markup language tags are included to associate developer commentary with program code in accordance with a preferred embodiment of the present invention;

FIG. 14 is a diagram depicting a portion of a source code document in which an additional constraint on a particular item of commentary is placed through the use of a markup tag attribute;

FIG. 15 is a screenshot diagram of an integrated development environment in which private source code commentary is being defined in accordance with a preferred embodiment of the present invention;

FIG. 16 is a screenshot of an integrated development environment in which source code commentary is being associated with a group of intended readers in accordance with a preferred embodiment of the present invention; and FIG. 17 is a flowchart representation of a process of creating and disseminating private source code commentary in accordance with a preferred embodiment of the present invention.

DETAILED DESCRIPTION OF PREFERRED EMBODIMENTS

Figure 1:
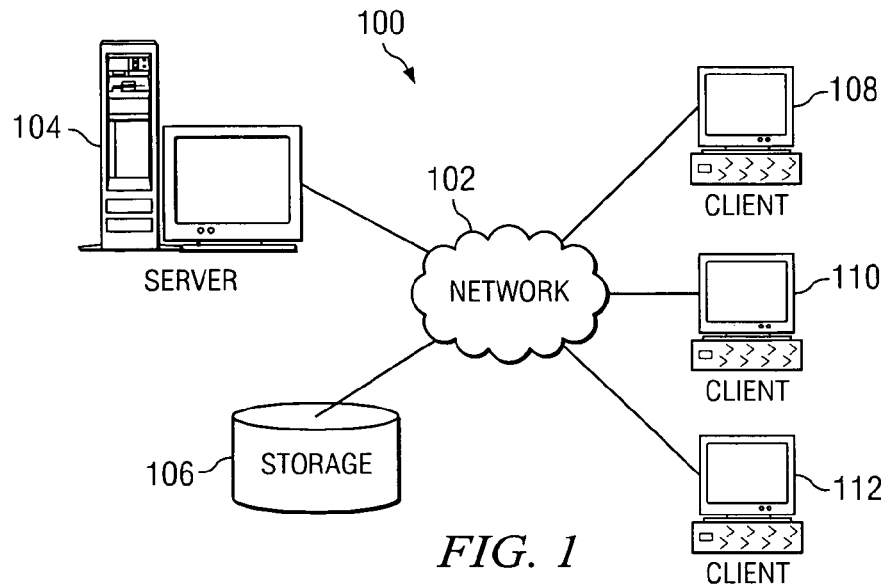
FIG. 1 is a diagram of a networked data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
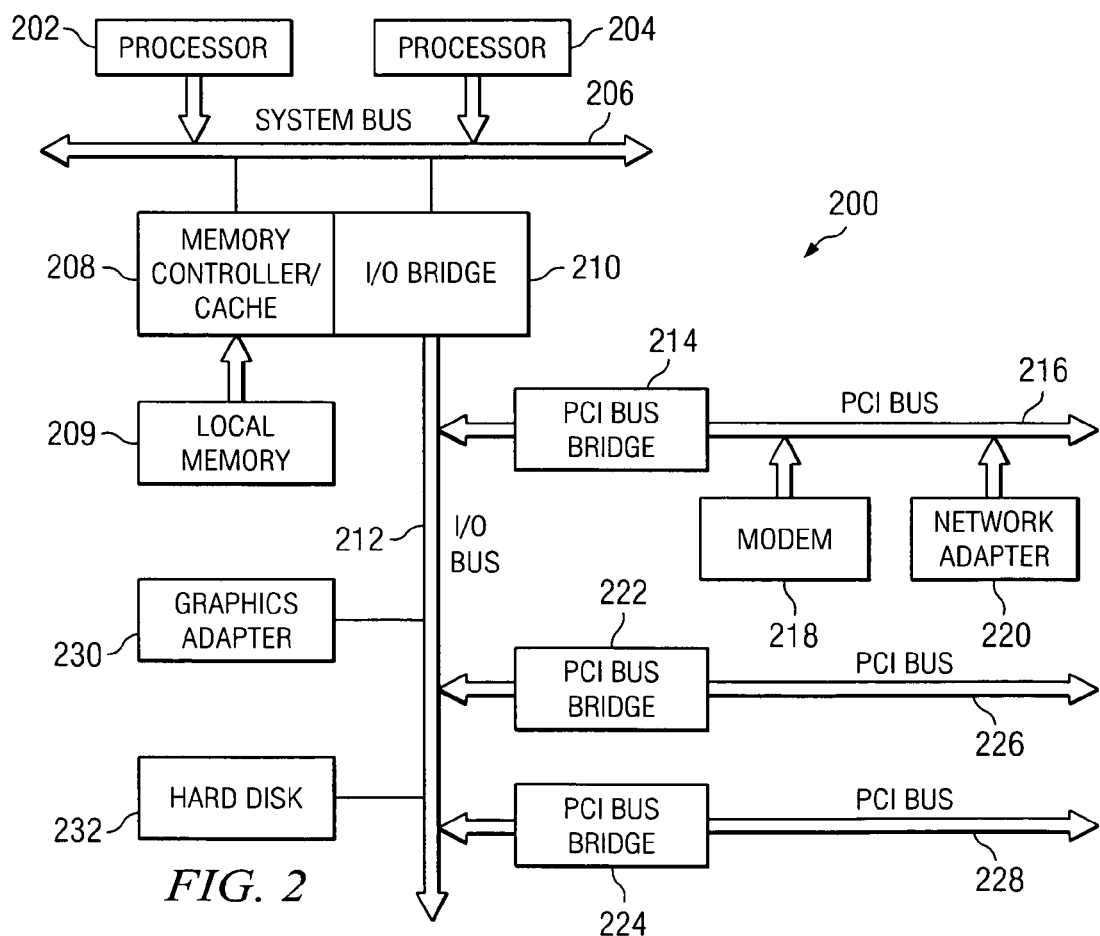
FIG. 2 is a block diagram of a server system within the networked data processing system of FIG. 1.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
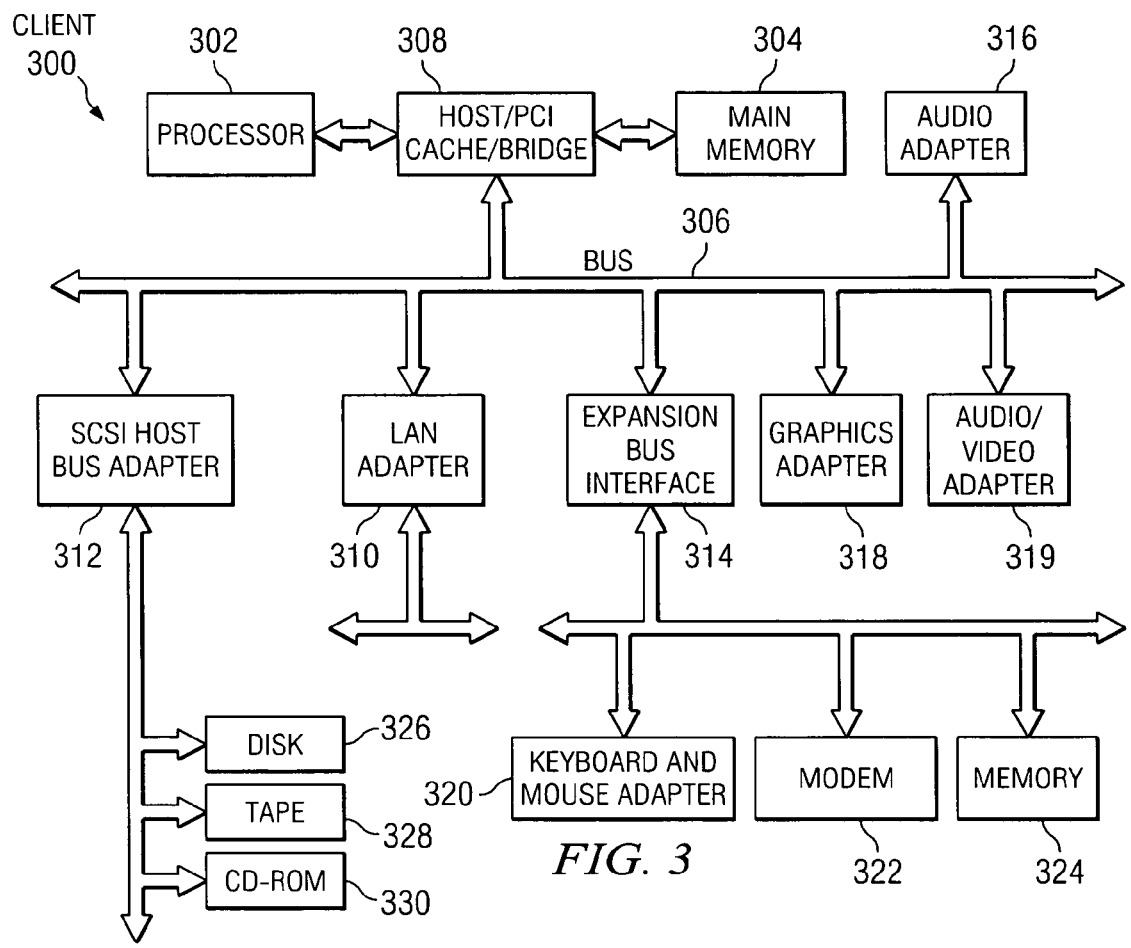
FIG. 3 is a block diagram of a client system within the networked data processing system of FIG. 1.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as the WINDOWS XP operating system, which is available from Microsoft Corporation. An object oriented programming system such as JAVA™ may run in conjunction with the operating system and provide calls to the operating system from programs or applications executing on data processing system 300. "JAVA" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
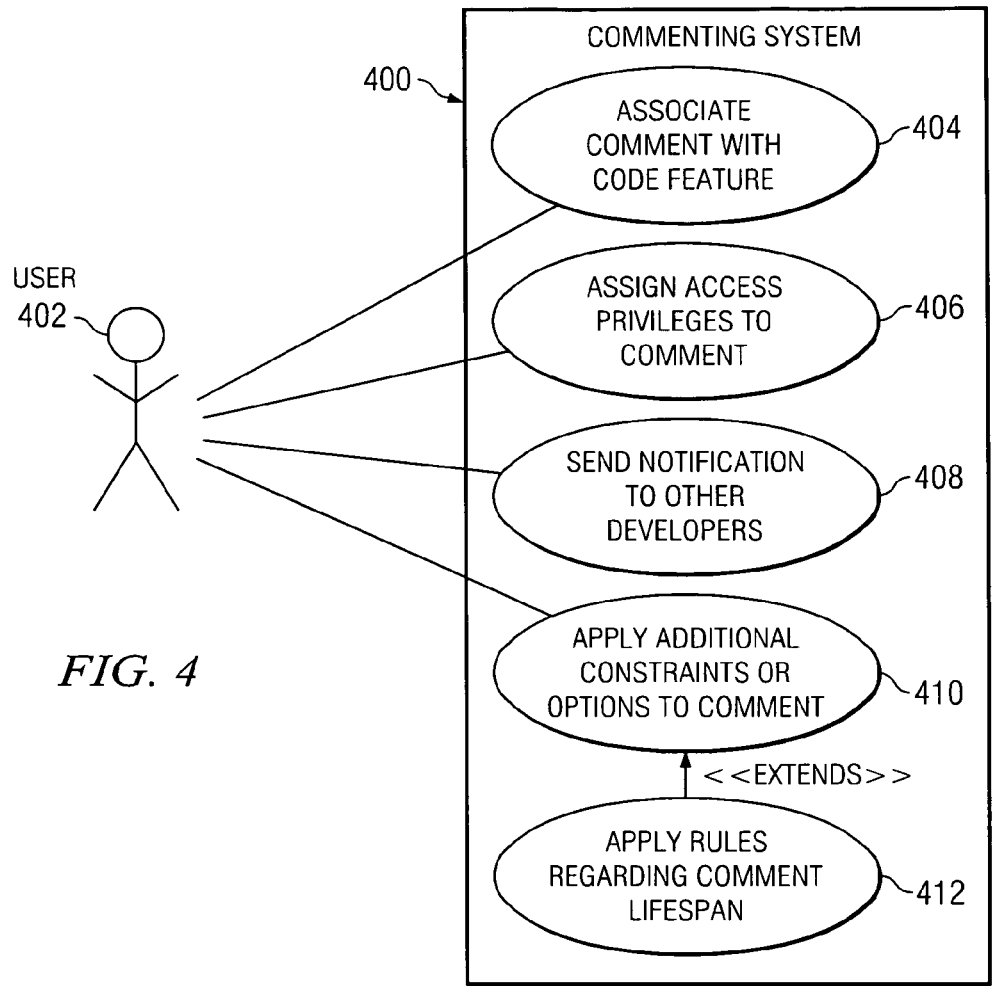
FIG. 4 is a use case diagram depicting use cases applicable to a preferred embodiment of the present invention.

The present invention provides a method, computer program product, and data processing system for exchanging information regarding software source code intended for limited distribution among a team of software developers. FIG. 4 is a use case diagram depicting particular user-directed actions (use cases) that can be performed by a preferred embodiment of the present invention. FIG. 4, like many of the other diagrams in this document, is patterned after the Uniform Modeling Language (UML), an open standard for object-oriented modeling of systems. It should be noted, however, that this document does not strictly follow the UML standard.

Now turning to the content of FIG. 4, commenting system 400 represents a preferred embodiment of the present invention. User 402 is a software developer using commenting system 400.

This document makes extensive use of the term "developer." Although a developer, as the term is used in the art, is generally a programmer (i.e., someone who writes program code), the term "developer" should be interpreted more broadly in this document. In the present context, the term "developer" is used to mean someone who may potentially view all or part of the source code to a software product.

One of ordinary skill will recognize that this definition of "developer" encompasses not only programmers, but other parties, as well. Some examples of "non-programmer developers" of a software product include software architects, members of management, software testers, intellectual property attorneys, consultants, system administrators, and the like. In some instances, the actual users of a software product may be considered "developers," as well, since in the case of some software products, customers, clients, or other end users are supplied with source code. In the case of open-source software, for example, sometimes an end user is provided with only the source code and must compile the source code into an executable form. In these situations it may be necessary for an end user to edit or at least view the source code in order to configure or modify the source code for the purpose of making the source code compile on a particular target machine or for the purpose of enabling or implementing optional or novel features in a software product.

Use cases 404-410 represent actions that user 402 may use commenting system 400 to perform. Commenting system 400 may be integrated or embedded into another tool such an integrated development environment (IDE) or editor. In particular, some editor programs, such as the widely-used open-source EMACS editor developed by Richard Stallman, are extensible in the sense that they include a facility for a user to program additional features into the editor application. For example, EMACS includes its own dialect of the LISP programming language, with which a user may program additional features as desired.

Alternatively, commenting system 400 may take the form of a standalone program or be embedded into a individual programming tool or a suite of tools. For example, commenting system 400 may be embedded within a configuration management system, such as the open-source configuration management tools RCS (Revision Control System) or CVS (Concurrent Versioning System), which are generally executed using a command-line interface in a POSIX-type operating system. POSIX stands for "Portable Operating System Interface, which is the name given to a family of operating system standards developed by IEEE, the Institute for Electrical and Electronics Engineers. AIX (Advanced Interactive executive), an IBM Corporation product, is an example of a POSIX-based operating system.

User 402 may associate a comment with a source code feature in a body of source code being edited or examined by user 402 (use case 404). "Source code" is computer program code that is in a form that can be edited by a developer. In the paradigmatic case of compiled languages such as C or an assembly language, source code will generally be made up of one or more text files (strictly speaking, assembly language is "assembled," but one of ordinary skill in the art will recognize that assembly may be thought of as a special case of compilation).

In this document, the term "source code" also includes code that is intended to be executed by an interpreter. Further, other non-text documents may also be considered "source code" for the purposes of this document. For example, class diagrams, state charts, and other graphical forms for representing software are also "source code" for the purposes of this document, since, in many cases, such diagrams may be translated or compiled into source code in a conventional programming language or even into executable or object code. For instance, a number of programming utilities exist within the art to convert diagrams in Uniform Modeling Language (UML) into source code in "conventional" text-based programming languages, such as Java and C++.

In addition, some programming environments support programming using graphical tools in place of or in addition to conventional text-based source code. For example, the JAVA™ programming language supports an application programming interface (API) called JAVABEANS™. The JAVABEANS™ API enables the creation of highly encapsulated objects (called "beans"), which support introspection and which are executed through an event-driven interface. Although the JAVABEANS™ API may be used for producing conventional text-based source code in the JAVA™ programming language, the JAVABEANS™ API also supports the creation of applications and configuration of "beans" using graphical environments. Thus, graphical program components, such as "beans," and graphically-programmed program code (such as an application utilizing the JAVABEANS™ API) are also considered source code for the purposes of this document.

"Source code feature" or "code feature," in this context, means a portion of a body of source code. A "body of source code," in the present context, means one or more files or other units of program source code.

In the vast majority of cases, a developer will want to associate commentary with code features that are defined by the programming language being used, such as a subroutine (e.g., a function, procedure, method, etc.), object, class, variable, or line or statement of code. In some circumstances, however, a developer may choose to associate a comment with an arbitrary portion of code, such as a portion of a statement, for example. A developer may also wish to associate a comment with one or more source code files in a body of source code.

One particularly significant reason why a developer might want to associate a comment with a language-defined code feature, and in particular a relatively "coarse-grained" feature such as a class or function, is that such features tend to persist over time. For example, specific lines of code in a function may change as a program is developed, but the function may persist. A preferred embodiment enables a developer to associate a comment with a language-defined code feature so that modifications to that code feature, such as deletions of lines of code from the code feature that do not destroy the code feature as a whole, do not also destroy the associated comment.

There are many ways in which association of a comment with a portion of program source code may be accomplished. For example, user 402 might highlight or otherwise select a portion of code in an editor program or IDE, then enter a comment in a special dialog box or window. An exemplary embodiment of the present invention that includes this feature is described in FIG. 15.

Alternatively, one may enter commentary directly into the text of a source document using special tags or characters to separate comments from program code and to associate particular comments with particular code features. This feature is described in FIGS. 13 and 14 with respect to an exemplary embodiment of the present invention utilizing markup language tags.

One of ordinary skill in the art will also recognize that many programming languages, such as the JAVA™ programming language, include special symbols or operators for denoting comments (e.g., /* and */ in the C programming language and other related programming languages). The placement of such a comment in a source file in proximity to a particular code feature can indicate an association between the comment and the code feature, as with "javadoc" comments in the JAVA™ programming language. This association by placement is typical of literate programming environments, such as the aforementioned WEB system of Donald Knuth, in which each "section" of a literate program has text and code sub-sections. Another way in which a comment may be associated with a particular code feature is to place associating information within a standard language-supported comment (e.g., placing a string such as "@associate=feature" in an ordinary programming language comment).

In a graphical programming environment, such as a "workbench" for configuring "beans" in the JAVABEANS™ API, or in a modeling environment, such as a UML modeling application, comments may be associated with code features (e.g., a bean) by affixing a graphical feature to a graphical program component and entering text. UML, for example, includes a "comment" symbol that may be affixed to a class or other UML artifact to provide free-form textual commentary. The UML comment symbol has the appearance of a dog-eared paper note, and text may be entered on the "writing surface" of the comment symbol.

Once a comment has been associated with a code feature, user 402 can assign access privileges to the comment to allow the comment to be accessed only by intended readers of the comment (use case 406). Assigning access privileges to source code commentary allows messages to be directed to specific other developers or to groups of developers. Developers who are granted an access privilege to a particular comment will be able to view the comment when viewing the associated source code (e.g., in an IDE, editor, or viewer program). Developers who are not given access privileges to a comment will not be able to read the comment when viewing the associated code feature (assuming, of course, that these "non-privileged" developers can access the actual code feature to begin with).

In one embodiment of the present invention, these "access privileges" may actually be bifurcated into distinct designations of "access privileges" and "intended readers." Specifying both access privileges and intended readers allows for situations in which one or more developers do not necessarily have use for particular information, but might have a possible use for the information in the future. In such instances, those particular developers can be given access privileges to the information, but not designated as intended recipients. The developers would then be able to access the information only if desired.

A key advantage to this feature of providing commentary only to selected readers is that an individual developer is provided with only the information that the developer needs and is not inundated with excessive information having little relevancy to that developer's particular work. This makes communication more efficient, because a developer does not have to spend as much time searching for information that the developer needs for that developer's particular contribution to a project. It also makes communication more effective, because a developer that has less to read is less likely to miss important information by skimming through material in an effort to save time. These advantages of a preferred embodiment of the present invention, although they can be realized in the context of practically any collaborative programming project, are particularly useful when applied in conjunction with extreme Programming (XP) or collaborative development over a network (e.g., collaborative open-source development over the Internet).

Also, when the full range of individuals who may view or edit the source code to a software product is considered, the ability to choose a set of intended readers for a particular comment is very useful, because different readers (especially those with non-programming roles) have different informational needs. A number of examples (not intended to be exhaustive) are provided here to suggest the diversity of informational needs that can arise in a particular project. A project manager, for example, may need a high-level view of the project as a whole. A software architect may need a more detailed high-level understanding that reveals how closely the implementation of the software matches the original design. An intellectual property attorney may only be concerned with code excerpts that illustrate a novel process or the practical application of a novel algorithm and may not have any need for much overall design information or low-level details. A user may only need to know where to look in order to configure or extend a software product, and may not have any need to understand low-level implementation details.

Commenting system 400 may also be used to send a notification to one or more developers to let those developers know that the comment has been created (use case 408). In a preferred embodiment, this notification process may be performed by sending an electronic mail or some other form of message (such as an "instant message" that appears on a recipient's desktop, within the recipient's IDE, or to an "instant messaging" client, such as AOL (America Online) INSTANT MESSENGER™, or via some other form of communication (e.g., sending a message to an alphanumeric pager, leaving a voice mail, sending a fax, etc.). Such a notification may include the particular source code feature that is commented and a copy of the comment (e.g., as an attachment to an electronic mail message), or an indication of where the commented code feature is located (e.g., file names and line numbers), or any other appropriate information for locating and/or displaying the comment and/or the associated source code feature.

Finally, additional options or constraints may be associated to the comment by user 402 (use case 410). An example of an additional option that might be incorporated into a comment is a rule concerning how long the comment should exist (use case 412). For example, a date and/or time for expiration of a comment may be specified. As another example, user 402 could specify that a comment should only exist as a part of a notification message and only as long as the notification message exists (e.g., in the recipient's electronic mail inbox). One of ordinary skill in the art will recognize, then, that a comment may be specified to be persistent, meaning that the comment will be saved to secondary storage (e.g., disk) along with the latest version of the source code, or a comment may be specified as being transient, so that the comment only exists in a notification message and is not recorded in persistent secondary storage.

While many of the advantages of the present invention can be appreciated from the enumerated use cases depicted in FIG. 4, one of ordinary skill in the art should recognize that the use cases depicted FIG. 4 are not intended to be exhaustive. One of ordinary skill in the art will recognize that additional comment-related functionalities may be provided for in an actual embodiment of the present invention.

Figure 5:
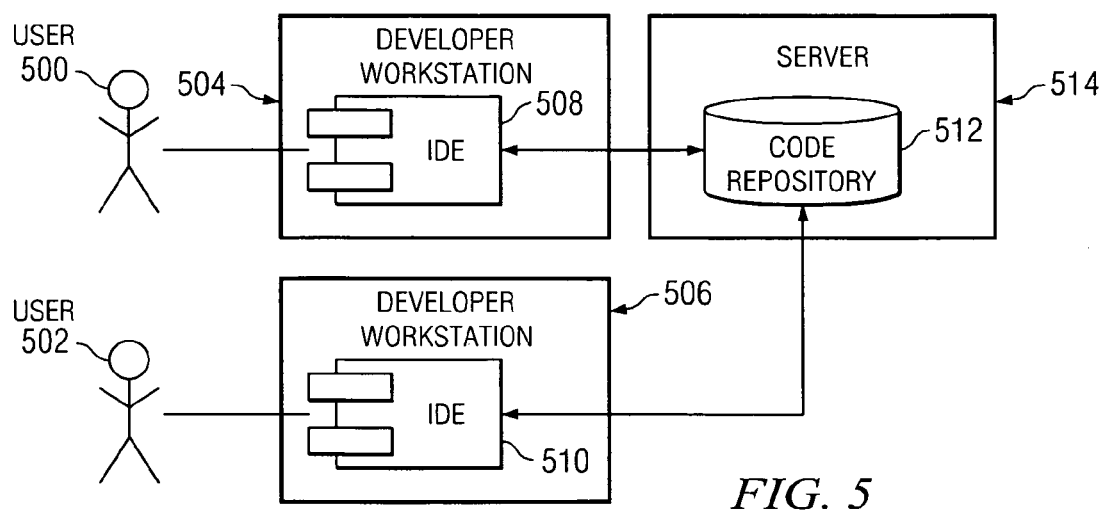
FIGS. 5-7 are deployment diagrams depicting various ways of deploying a source code private commenting system in accordance with a preferred embodiment of the present invention.
Figure 6:
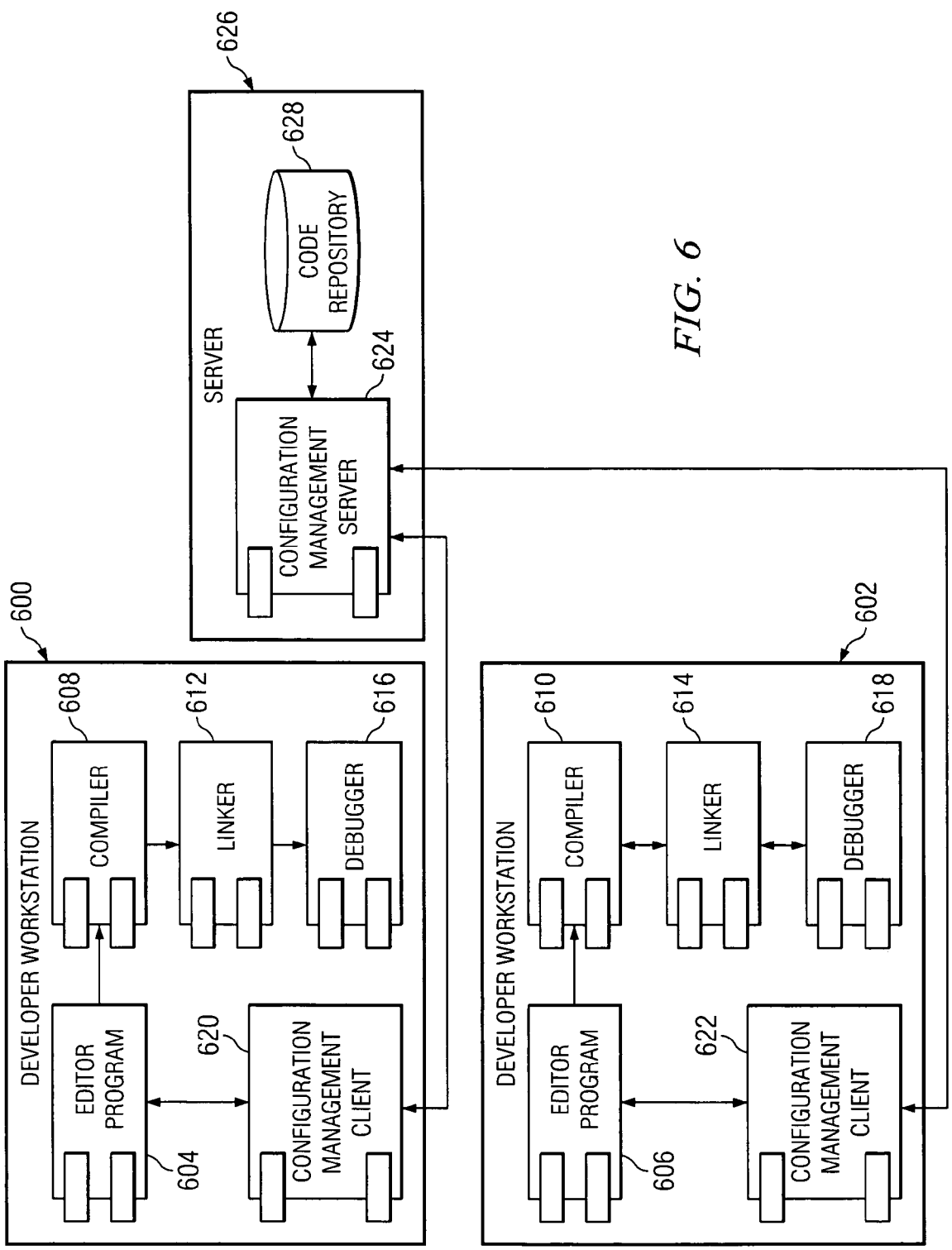
Figure 7:
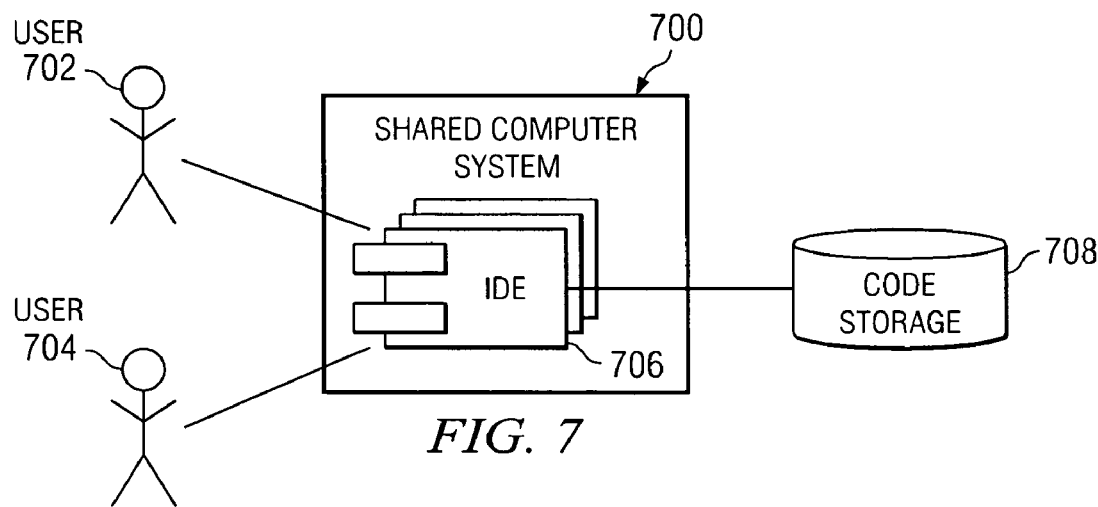

Moreover, one of ordinary skill in the art will recognize that even the functionalities described in FIG. 4 are themselves amenable to a wide range of variations in the implementation of such functionalities. As stated previously, a preferred embodiment of the present invention may be incorporated into wide variety of programming tools or embodied in one or more stand-alone tools. FIGS. 5-7 are deployment diagrams that illustrate a number of different configurations of software development tools in which the present invention may be embodied. While FIGS. 5-7 depict with specificity a number deployments of embodiments of the present invention, it should be noted that the various configurations depicted herein are not intended to be exhaustive of the wide range of architectural and deployment-related variations within the scope and spirit of the present invention.

FIG. 5 is a deployment diagram depicting a preferred embodiment of the present invention in which features of present invention are incorporated into integrated development environments (IDEs). User 500 and user 502 are developers in a collaborative software development project. Users 500 and 502 develop source code on network-attached workstations 504 and 506 using IDEs 508 and 510, respectively. IDEs 508 and 510 store source code in a common code repository 512 associated with a server 514. Code repository 512, in a preferred embodiment, may be implemented as a Network File System (NFS) or other shared volume that is mounted by both workstation 504 and workstation 506. In the embodiment depicted in FIG. 5, IDEs 508 and 510 are used to edit, compile, and comment source code. Comments are stored in code repository 512 along with the source code, either in separate files for comments and code, or together in a combined file format.

Thus, if user 500 creates a comment and associates that comment with a particular source code feature using IDE 508, when user 500 saves the edited source code, the comment and source code will be saved to code repository 512 along with user 500's designation of intended readers of the comment. When the source code is viewed by user 502 via IDE 510, the comments for which user 502 is an intended reader are displayed by IDE 510 in conjunction with the source code.

FIG. 6 is a deployment diagram of a preferred embodiment of the present invention in which a plurality of tools are utilized in place of IDEs. The embodiment depicted in FIG. 6 also utilizes a configuration management system based on a client-server architecture, in which the configuration management system is enhanced to provide commenting features in accordance with the present invention.

In FIG. 6, developer workstations 600 and 602 each support a suite of software development tools (i.e., components 604-622, even numbers). With respect to workstation 600, these tools include an editor program 604 for editing source code, a compiler 608 for compiling source code into object code modules, a linker 612 for linking object code modules into executables, a debugger 616 for monitoring the execution of an executable for the purpose of identifying bugs, and a configuration management client 620.

In this depicted embodiment, the commenting-related features of the present invention are, for the most part, incorporated into configuration management client 620 and editor program 604.

Editor program 604 is used to view and edit source code. Editor program 604 allows a user to enter comments to be associated with particular code features and allows a list of intended readers to be associated with the comment as well. As stated previously, this association of a comment to a code feature may be accomplished using various techniques, including inserting comment text or markup tags into a source code text file and entering comment text special commands or graphical means provided by editor program 604, among others.

Configuration management client 620 is used to check source code in and out of a code repository 628 that is controlled by a configuration management server 624 (software) residing on a server 626 (hardware). When source code that has been annotated with comments by editor program 604 is checked into code repository 628 by configuration management client 620, the comments are also stored in code repository 628. When configuration management client 622 is used to retrieve the source code, configuration management server 624 returns the source code along with only those comments for which the user of developer workstation 602 is listed as an intended reader.

Configuration management systems are typically designed to generate desired versions of source code files from stored changes. Such systems are also typically designed to enforce different levels of access privileges for different developers. The implementation of the preferred embodiment depicted in FIG. 6 by enhancing a configuration management system to support access control for comments and to assemble differently commented versions of a source code file for different developers may thus be accomplished by programming the configuration management system to assemble different versions of a source code file according to version-identifying criteria that not only include a version number (as in conventional configuration management systems), but also the identity of the developer requesting the source file.

FIG. 7 is a deployment diagram depicting a preferred embodiment of the present invention in which a shared computer system, such as a single server or timesharing system, is utilized as the hardware platform. Shared computer system 700 is operated by users 702 and 704. User 702 and user 704 have separate IDE processes 706 executing on shared computer system 700. IDE processes 706 share a common code storage facility 708, which may be, for example, an attached hard disk drive or other secondary storage device. One of ordinary skill in the art will recognize that IDE processes 706 may be replaced with processes executing other development tools, such as development tools in a suite of development tools, as well (e.g., as in FIG. 6).

Figure 8:
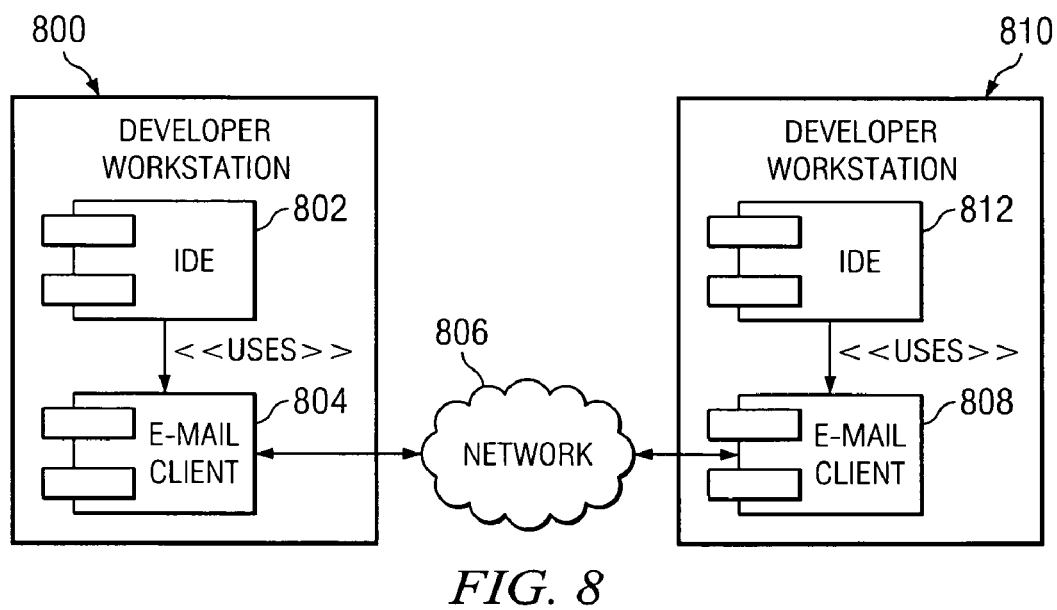
FIG. 8 is a deployment diagram depicting the use of electronic mail notification of source code commentary in accordance with a preferred embodiment of the present invention.

FIG. 8 is a deployment diagram illustrating architecture utilized in a preferred embodiment of the present invention for notifying an intended reader of a comment that the comment is available. A developer workstation 800 supports an IDE 802, which is used to create and display comments in accordance with a preferred embodiment of the present invention. IDE 802 communicates with an e-mail client program 804, which is also deployed on developer workstation 800. E-mail client 804 allows electronic mail messages to be transmitted over network 806. When a user creates a comment using IDE 802, IDE 802 uses e-mail client 804 to transmit an electronic mail message to the intended readers of the comment to notify the intended readers that the comment is available. This electronic mail message may include actual source code and comment text or it may contain other information, such as a file names and locations, to allow the intended reader to locate the comment and associated source code.

For example, assume that developer workstation 810 is the workstation of an intended reader of a comment created by the user of developer workstation 800. E-mail client 808, which resides on developer workstation 810, will receive an electronic mail message as a notification. In a preferred embodiment, E-mail client 808 may be programmed to forward the received notification message to IDE 812 on developer workstation 810. IDE 812 can then display the comment and associated source code portion for the user of developer workstation 810.

Several variations on the notification scheme depicted in FIG. 8 may be utilized in place of or in addition to the features described in FIG. 8. For example, although FIG. 8 shows separate IDE and E-mail client processes, one of ordinary skill in the art will recognize that a single program may be used for both editing source code and comments and for sending mail. For example, the open-source EMACS text editor supports electronic mail features as well text-editing capabilities. Alternatively, more specialized tools, such as command-line driven programming tools, may be utilized instead of an IDE.

The particular protocol through which notification messages are transmitted may differ as well. For example, some form of instant messaging or chat protocol may be used in place of or in addition to electronic mail. Other physical media, such as telephone-based messaging or facsimile may be used, as well. One of ordinary skill in the art will recognize that a wide variety of communications media may be employed to provide notification capabilities without departing from the scope and spirit of the present invention.

Figure 9:
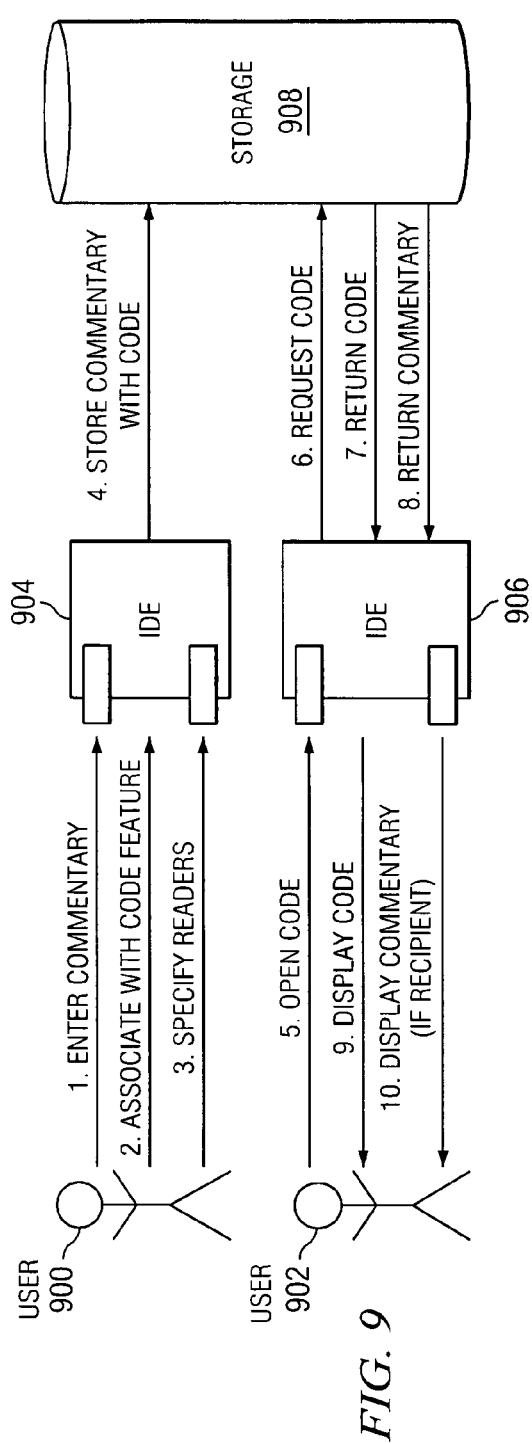
FIG. 9 is a collaboration diagram depicting a process of producing and disseminating private source code commentary in accordance with a preferred embodiment of the present invention.

FIGS. 9-12 concern the storage and retrieval of comments and source code. FIG. 9 is a collaboration diagram that provides a general overview of the actions performed by a preferred embodiment of the present invention. In FIG. 9, user 900 enters commentary into an IDE 904 (or other suitable program, as discussed above) (action 1). User 900 associates the entered commentary with a source code feature (action 2). A set of intended readers is also specified by user 900 (action 3). IDE 904 stores the commentary and associated source code to secondary storage 908 (action 4). In one embodiment, storage and retrieval to/from secondary storage 908 is controlled by a configuration management system.

User 902, who we will assume is an intended reader of the comment, opens the source code for editing or viewing using IDE 906 (action 5). IDE 906 then requests the code from secondary storage 908 (action 6). Storage 908 returns the requested code (action 7) and the associated commentary (action 8). IDE 906 then displays the requested code 906 (action 9) and also the associated commentary (assuming, of course, that user 902 is an intended reader of the commentary) (action 10).

Figure 10:
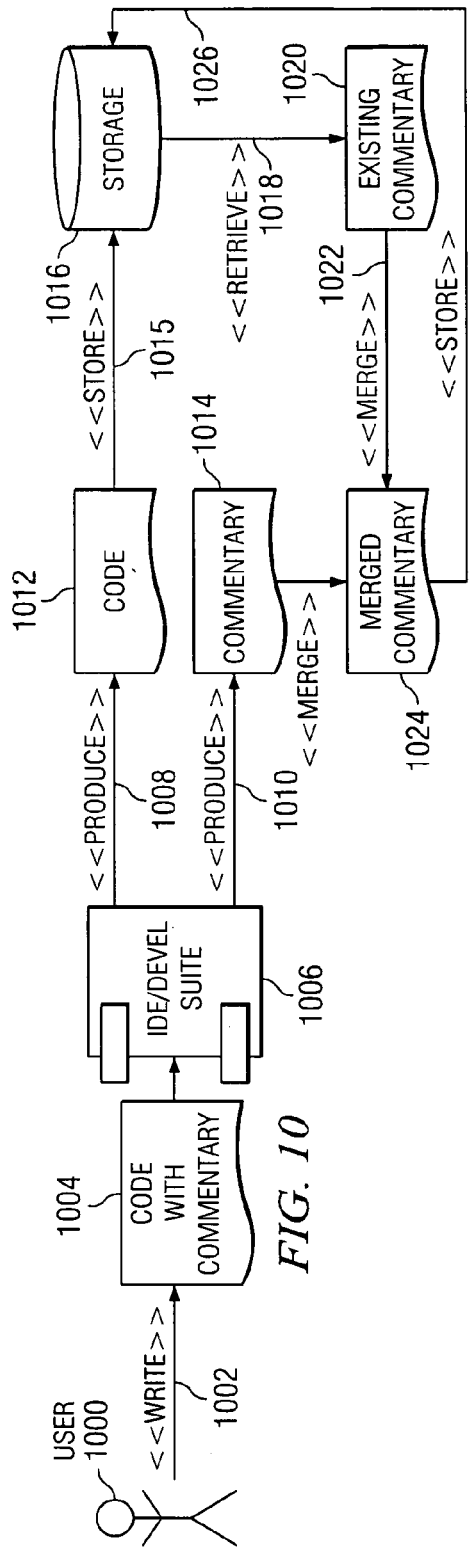
FIG. 10 is a flow diagram depicting a process of storing commentary in accordance with a preferred embodiment of the present invention.

FIGS. 10-12 describe a number of possible storage and retrieval schemes for performing the actions described in FIG. 9. FIGS. 10-12 are not intended to provide an exhaustive catalog of all possible schemes that may be employed in an embodiment of the present invention. Rather FIGS. 10-12 merely exemplify how storage and retrieval of comments and associated source code may be achieved in the context of the present invention. One of ordinary skill in the art will recognize that the examples provided here suggest a wide range of variations in the way comments and associated source code may be stored and retrieved within an embodiment of the present invention.

FIG. 10 is a diagram depicting a process of storing commentary in an embodiment of the present invention in which source code and commentary are stored separately in secondary storage. User 1000 writes source code 1004 with which user 1000 associates commentary (action 1002). User 1000 enters the source code and commentary into an IDE 1006 (which could alternatively be a suite of development tools), which supports private source code comments in accordance with a preferred embodiment of the present invention.

IDE 1006 produces from commented source code 1004 a source code document 1012 (action 1008) and a commentary document 1014 (action 1010). One of ordinary skill will recognize that source code document 1012, consisting of only source code, can be compiled or interpreted by any compiler or interpreter for the language the source code is implemented in. Source code document 1012 is stored in secondary storage 1016.

Commentary document 1014 contains commentary and association data to allow the commentary to be associated with source code features contained within source code document 1012. A document containing existing commentary 1020 is retrieved from secondary storage 1016 (action 1018). The commentary from commentary document 1014 is merged with existing commentary document 1020 to form a merged commentary document 1024 (action 1022), which is then stored in secondary storage 1016 (action 1026).

FIG. 11 is a diagram depicting a reverse process with respect to the process described in FIG. 10, in accordance with a preferred embodiment of the present invention. FIG. 11 depicts a process of displaying selected commentary to an intended reader, user 1116. Source code document 1100 and merged commentary document 1106 are retrieved from secondary storage. Since merged commentary document 1106 contains a composite set of comments for different sets of intended readers, merged commentary document 1106 is filtered (action 1108) to obtain a filtered commentary document 1110 containing only comments for which user 1116 is an intended reader. Filtered commentary document 1110 is then loaded (action 1112) into IDE 1104 along with source code document 1110 (action 1102) for display to user 1116 (action 1114).

In an alternative embodiment, source code and comments may be stored in a single file. FIG. 12 depicts a process of processing a combined code/comment file 1200 for display and compilation of source code and comments by a developer. Combined file 1200 is filtered to remove from combined file 1200 comments that do not pertain to the developer (action 1202), thereby obtaining a filtered combined commentary and source code document 1204. Combined document 1204 may then be formatted (action 1210) to obtain commented source code in a format suitable for display (action 1212).

Combined file 1200 may also be filtered to remove all of the commentary (action 1206) and thus obtain clean source code 1208 suitable for compilation or interpretation. For example, clean source code 1208 may be compiled (action 1214) to obtain relocatable or executable object code 1216.

FIGS. 13-16 concern the entry and display of private source code comments in accordance with a preferred embodiment of the present invention. FIGS. 13 and 14 depict a comment and source code format utilizing tags in a markup language to associate comments with source code features.

FIG. 13 is a diagram of an excerpt from a combined source code and commentary document made in accordance with a preferred embodiment of the present invention utilizing markup language tags for associating comments with source code features. In this example, the markup language that is used is eXtensible Markup Language (XML), although any one of a number of markup languages may be used without departing from the scope and spirit of the present invention. "Commented" tags 1300 and 1302 denote that source code statement 1303 is associated with commentary. Comment tags 1304 and 1306, which are nested within tags 1300 and 1302, enclose a single comment. The label of tags 1304 and 1306 denote the intended reader of the comment (Kulvir). Tags 1310 and 1312, labeled "mike-kulvir" enclose a comment that is intended to be read by both Mike and Kulvir (i.e., two intended readers). When the source code/commentary excerpt is displayed to a developer, the comments will be filtered, so that only comments directed to the intended readers will be displayed.

In a preferred embodiment, groups of intended readers may be specified by listing the members of the group or by referring to the group by name. For example, in the example source code/commentary excerpt provided in FIG. 14, tags 1408 and 1410 enclose a comment that is intended to be read by anyone reading the source code. Additional options or constraints for comments may be included, as well. Tag 1400 of FIG. 14 includes an additional attribute 1404 that denotes an expiration date for the comment enclosed by tags 1400 and 1402.

FIGS. 15 and 16 describe the entry of comments into a source code file being edited in windowed IDE in accordance with a preferred embodiment of the present invention. Window 1500 represents the main window for an IDE in a windowed graphical user interface (GUI). A pointing device cursor 1501 is used to select text and actuate components in window 1500. Editing area 1502 is used to edit source code text. Additional controls are provided for accessing other development features. Comment button 1504 allows the entry of comments in accordance with a preferred embodiment of the present invention (q.v.). Compile button 1506 allows the source code in the IDE to be compiled. Run button 1508 allows the program represented by the source code in the IDE to be executed.

In this example, a developer may associate a comment with a particular code feature by selecting (highlighting) the particular code feature with pointing device cursor 1501, as with selected code feature 1510, then actuating comment button 1504. A commentary entry box 1512 is then displayed with a cursor 1514 provided for the entry of commentary text. Once the commentary text has been entered (signified, for example, by the developer's pressing the "enter" or "return" key on the workstation's keyboard), an additional dialog box is displayed, as depicted in FIG. 16.

FIG. 16 is a diagram of a dialog box 1604 for entering one or more intended readers of a source code comment 1602 associated with source code 1600 in an IDE implemented in accordance with a preferred embodiment of the present invention. List 1606 provides a list of possible intended readers or groups of intended readers. In this preferred embodiment, the possible intended readers and groups of intended readers in list 1606 may be extracted from a directory service, such as a directory service based on the Lightweight Directory Access Protocol (LDAP), which allows hierarchical directory structures to be created, modified, and accessed. The developer selects the intended readers by highlighting (e.g., highlight bar 1608) the desired selections and actuating "OK" button 1612. Additional controls may be provided for other options, such as electronic mail or instant messaging notification. For example, in FIG. 16, dialog box 1604 includes radiobuttons 1610 and 1611 for allowing electronic mail- or instant messaging-based notification of new comments.

In a preferred embodiment of the present invention, when an intended recipient of a comment views that comment, it comment is highlighted, so as to make that intended recipient aware that the comment is a comment that is not necessarily available to all readers of the source code.

FIG. 17 is a flowchart representation of an overall process of private source code messaging in accordance with a preferred embodiment of the present invention. A user enters a comment (block 1700), which the user associates with a code feature (block 1702). Then, the user associates a list of intended readers with the comment (block 1704). If the user intends for the readers to be notified of the comment (block 1706: Yes), a notification (e.g., via electronic mail or instant messaging) is sent to the readers (block 1708). After sending the notification or determining that notification is not desired, the comment is stored along with the source code (e.g., in a configuration management system).

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
   receiving a first designation of a particular portion of a body of source code;
   receiving a second designation of an association of the particular portion of the body of source code with commentary related to the particular portion of the body of source code;
   receiving a third designation of a set of intended readers of the commentary; and
   making the commentary and the particular portion of the body of source code accessible to only the set of intended readers, wherein the set of intended readers is designated by a user's selecting the set of intended readers from a set of potential intended readers, and wherein the set of potential intended readers is acquired by accessing a directory service.

2. The method of claim 1, further comprising:
   receiving a fourth designation of a particular time period during which the commentary will be available, wherein the commentary and the particular portion of the body of source code are accessible to the set of intended readers during the particular time period.

3. The method of claim 1, further comprising:
   sending a notification to at least one subset of the set of intended readers to notify the at least one subset of the set of intended readers that the commentary is available.

4. The method of claim 3, wherein the notification includes copies of the commentary and the particular portion of the body of source code.

5. The method of claim 3, wherein the notification is sent to the at least one subset of the set of intended readers via electronic mail.

6. The method of claim 1, wherein the second designation is represented in the form of at least one tag in a markup language,
   wherein the at least one tag is embedded within the body of source code.

7. The method of claim 1, further comprising:
   generating, from the body of source code, a second body of source code that is capable of being compiled by a compiler.

8. The method of claim 1, further comprising:
   formatting the commentary and the particular portion of the body of source code for display to a user.

9. The method of claim 1, wherein the particular portion of the body of source code is one of a subroutine, a line of code, a variable, an identifier, and a source code comment.

10. The method of claim 1, wherein the commentary and the body of source code are recorded within a configuration management system, and
    wherein the commentary is made available to the set of intended readers by presenting the commentary along with the body of source code in response to a checking-out of the body of source code by one of the set of intended readers.

11. The method of claim 1, wherein the method is executed in an integrated development environment.

12. The method of claim 1, wherein the method is executed from a program having a command-line interface.

\* \* \* \* \*